Figure 1:
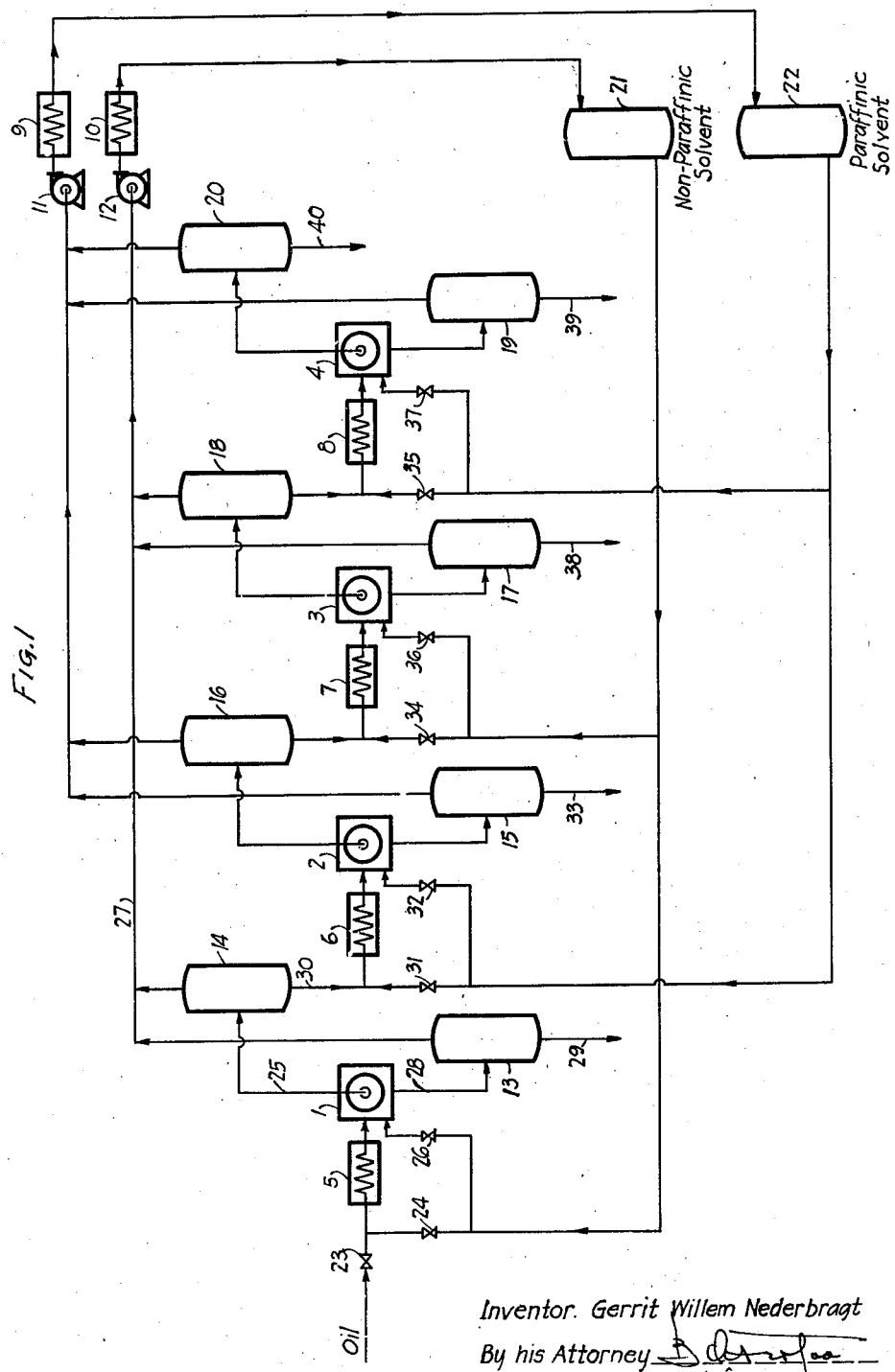

June 24, 1941.　　G. W. NEDERBRAGT　　2,246,982
PROCESS FOR FRACTIONATING HYDROCARBON OILS
Filed Jan. 21, 1939　　2 Sheets-Sheet 1

Inventor. Gerrit Willem Nederbragt
By his Attorney

Patented June 24, 1941

2,246,982

UNITED STATES PATENT OFFICE 2,246,982

PROCESS FOR FRACTIONATING HYDROCARBON OILS

Gerrit Willem Nederbragt, Amsterdam, Netherlands, assignor to Shell Development Company, San Francisco, Calif., a corporation of Delaware Application January 21, 1939, Serial No. 252,162
In the Netherlands March 11, 1938

12 Claims. (Cl. 196—13)

This invention relates to a process for separating hydrocarbon mixtures, such as petroleum oils and fractions thereof, particularly gasoline, kerosene, gas oil, lubricating oils, which may or may not contain wax, and normally solid fractions, such as paraffin wax and petrolatum, into fractions of different properties by crystallization from a solution of the mixture in a suitable diluent. The process may, for example, be employed to produce fractions of high paraffinicity and fractions of low paraffinicity, or to produce lubricating oils having a low Conradson carbon residue.

It is known to separate hydrocarbons which solidify at different temperatures by dissolving their mixture in a suitable diluent, cooling the solution to a temperature at which a portion thereof is solidified or crystallized, and separating the solid or semi-solid portion from the liquid portion by suitable physical means, such as filtration, settling or centrifugation (see U. S. Patents Nos. 1,980,649 and 2,108,629). Such a process may be operated at ordinary temperatures or relatively low temperatures, such as between 0° C. and —130° C. Unless the initial mixture contains only hydrocarbons having molecular sizes falling within a comparatively narrow range, the complete separation between hydrocarbons belonging to different chemical classes, i. e., paraffins and aromatics, is impractical by such a method, because mixtures covering a greater range of molecular sizes generally contain hydrocarbons of several types having closely similar solidification temperatures in the presence of any one solvent or mixture of solvents.

In accordance with the present invention it was found that improved fractionations can be achieved by subjecting the mixture to a series of separations wherein solid fractions are repeatedly separated by crystallization or lixiviation from a mother liquid containing the unsolidified portion of the mixture and a solvent, the separations being effected alternately in the presence of a solvent with a good solvent power for paraffinic hydrocarbons, hereinafter designated as a preferential solvent for hydrocarbons of high paraffinicity or as a paraffinic solvent, and in the presence of a solvent with a good solvent power for non-paraffinic hydrocarbons, hereinafter designated as a preferential solvent for hydrocarbons of low paraffinicity, or as a non-paraffinic solvent.

In an embodiment of the process, the hydrocarbons, remaining unsolidified in the mother liquid containing a preferential solvent for hydrocarbons of a certain paraffinicity, e. g. of low paraffinicity after the separation of one solidified fraction are further treated to solidify one or more fractions in the presence of a preferential solvent for hydrocarbons of different paraffinicity, e. g., of high paraffinicity. A solidified fraction may be further treated after its separation from a first mother liquid by wholly or partly dissolving it in a solvent belonging to the same group of solvents as that which was employed in producing the solid fraction and recrystallizing or lixiviating some of the hydrocarbons to produce a second solidified fraction and a second mother liquid; the second solid fraction may then be again recrystallized from or lixiviated with the solvent employed in the first crystallization or lixiviation, or a solvent belonging to the same group, any desired number of such stages being possible. The process according to the invention may also be applied to the hydrocarbons dissolved in the second or in a subsequent mother liquid produced in the recrystallization or lixiviation of the solidified fraction, as just described. It was found that by subjecting the mixture to such a series of separations, it is possible to obtain the various components or groups of components contained in the hydrocarbon mixture in a much higher state of purity.

When the crystallization is effected in the presence of a preferential solvent for hydrocarbons of high paraffinicity, one obtains a solid or semi-solid cake containing hydrocarbons with a relatively slightly paraffinic character (including aromatic and alkyl aromatic hydrocarbons) in a pure or practically pure state; the hydrocarbons with the relatively highly paraffinic character remain dissolved in the solvent. The solids may be separated by filtration, centrifugation, or any similar means. On the other hand, in the step of crystallization in the presence of a preferential solvent for hydrocarbons of low paraffinicity, the hydrocarbons with the relatively highly paraffinic character are obtained in a solid pure or substantially pure state, while those with a relatively slightly paraffinic character remain dissolved in the solvent.

When lixiviation is applied to the wholly or partly solidified hydrocarbon mixture by means of a paraffinic solvent, there remains a solid or semi-solid mass containing hydrocarbons with a relatively slightly paraffinic character, whereas the hydrocarbons with high paraffinicity are dissolved in the solvent and conversely.

It was further found that fractions having a low carbon residue are solidified when a preferential solvent for hydrocarbons of low paraffinicity is employed as the diluent, while fractions with a high carbon residue are obtained in the solid form in the alternate crystallizations from a preferential solvent for hydrocarbons of high paraffinicity.

The choice of which of the two types of solvents is to be applied in the first step of the process depends upon the character of the hydrocarbon mixture to be treated. Thus, for example, when starting from a hydrocarbon oil in respect to which it has been found that when the oil is cooled to solidify a portion, a fraction of relatively slightly paraffinic cake crystallizes out first, the treatment will be commenced with a preferential solvent for hydrocarbons of high paraffinicity, and the temperature of the first step will be so regulated that a fraction of relatively slightly paraffinic character will be obtained in the solid state in the desired degree of purity. After separating the crystallized fraction from the mother liquid containing the solvent and liquid hydrocarbons the solvent is separated from the mother liquid, a preferential solvent for hydrocarbons of low paraffinicity is added to the hydrocarbons recovered from the mother liquid, and the resulting solution is cooled to crystallize out a fraction having relatively highly paraffinic character, which is then separated from the second mother liquid containing the non-paraffinic solvent and liquid hydrocarbons. The cooling step may at times be omitted. On the other hand, when starting with an oil from which a fraction with a relatively highly paraffinic character crystallizes out first, the order in which the solvents are applied would be reversed. Two or more corresponding fractions, e. g., several solid fractions separated in stages wherein the same solvent or solvents belonging to the same group are employed, may be blended with one another.

The temperature for each crystallization and separation will be selected in accordance with the degree of purity desired for the successive fractions, and the temperature differences between separations and the range of freezing points of the constituents of the mixture will determine the number of stages to be employed. To obtain fractions which are as pure as possible it is necessary to apply the proper temperature for each stage, viz., the temperature at which the group of components for which the solvent employed has a high solvent power, just does not crystallize out.

Any solvent having a high solvent power for paraffinic hydrocarbons may be employed as the preferential solvent for hydrocarbons of high paraffinicity or paraffinic solvent in the steps in which hydrocarbons of relatively slightly paraffinic character and/or high density and/or high carbon residue are solidified. Examples of such solvents are: aliphatic hydrocarbons, such as ethane, propane, butane, isobutane, pentane, isopentane, hexanes, etc., cyclohexane, decaline, their corresponding olefines, mixtures thereof, and the like or products consisting predominantly of such hydrocarbons, e. g., gasolines, kerosenes, and the like, which are preferably poor in aromatics. Solvents boiling below about 40° C. are preferred. These solvents are employed in the liquid state and superatmospheric pressure is often required when using normally gaseous materials, such as ethane, propane and butanes. This group of solvents may also be designated as a "non-polar" group.

For the alternate crystallizations any good solvent for non-paraffinic hydrocarbons may be employed as the preferential solvent for hydrocarbons of low paraffinicity or non-paraffinic solvent. These solvents should be liquid or liquefiable at the temperature of the process in the presence of the mixture being fractionated. Most organic liquids having relatively low solidifying temperatures and which are polar or readily polarizable are suitable, so that this group of solvents may be designated as the "polar" group. Examples of such solvents are: toluol, chloroform, dichlorethane, carbon disulphide, sulphur dioxide, ethers, particularly dimethyl and diethyl ether, esters, such as methyl formate, methyl acetate and ethyl acetate, ketones, such as acetone, alcohols, such as ethyl- and isopropyl alcohols, heterocyclic compounds, such as pyridine, a-picoline and furfural, and their mixtures with each other and with aromatic hydrocarbons, particularly toluol.

Figure 2:
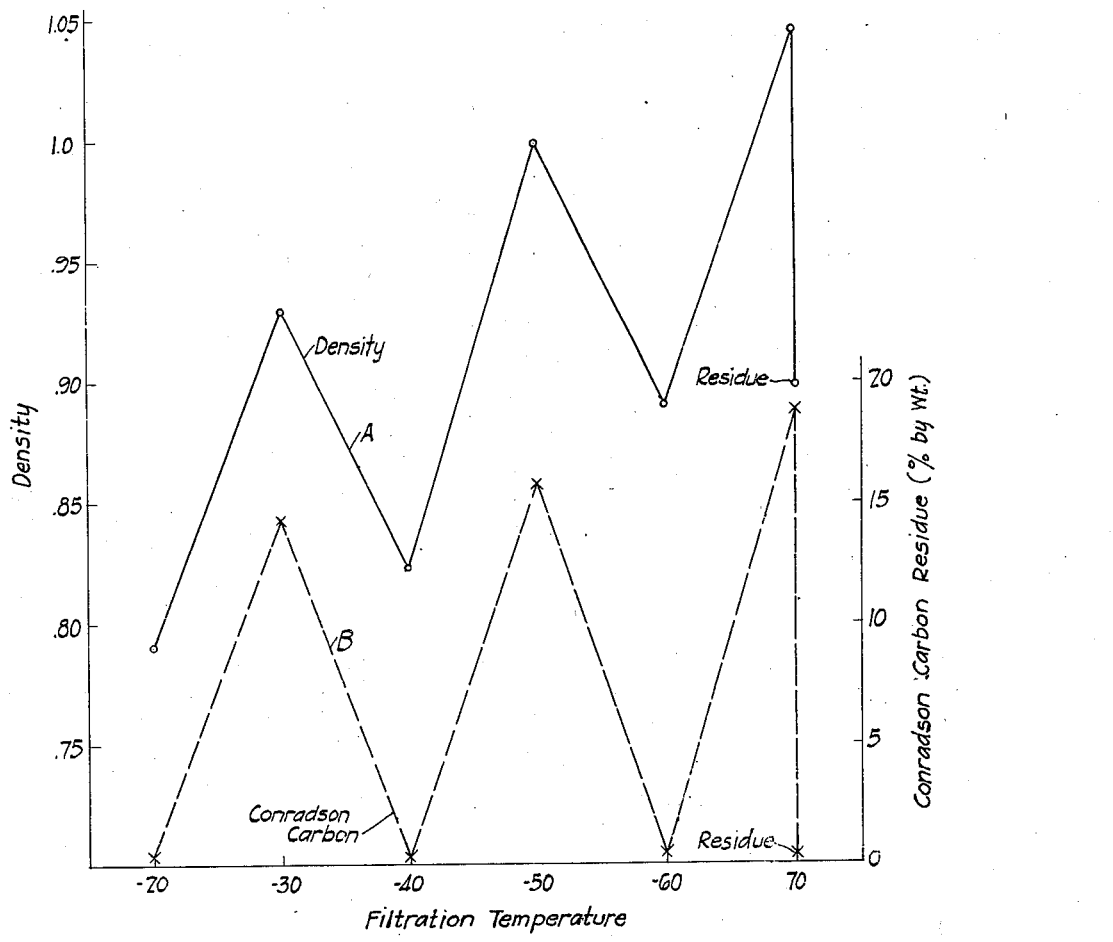

The invention may be more fully understood from the following description, in connection with the drawings, in which Figure 1 is a schematic flow diagram illustrating the steps employed in one embodiment of the process, and Figure 2 is a diagram illustrating the results obtainable, the data having reference to the run described in Example I.

Referring to the drawings, 1, 2, 3 and 4 are filtration apparatus; 5, 6, 7 and 8 are heat exchangers, 9 and 10 are condensers, 11 and 12 are compressors, 13 to 20 are evaporators adapted for the separation of solvent from hydrocarbons with or without the application of heat, 21 is a storage tank for the non-paraffinic solvent, and 22 is a similar storage tank for the paraffinic solvent. Gauges, pumps, and other auxiliary apparatus, well known in the art, are not shown. The initial oil is introduced via valve 23, commingled with non-paraffinic solvent supplied via valve 24 from tank 21 and the resulting solution is, if necessary, brought to a temperature at which a portion thereof is solidified by flow through the heat exchanger 5. The solidified material is separated from the first mother liquid containing the non-paraffinic solvent and liquid hydrocarbons in the form of a filtrate in the filter 1, the filtrate being withdrawn via conduit 25. The cake is then washed with the same solvent introduced via valve 26, the washing liquid being combined with the filtrate and flowed through conduit 25 to the evaporator 14. The non-paraffinic solvent is vaporized, the vapours passing via conduit 27 to the compressor 12, and being then condensed and returned to the tank 21. The first solidified fraction is withdrawn from the filter via conduit 28, freed from the non-paraffinic solvent in the evaporator 13 and withdrawn at 29 as a product having a highly paraffinic character.

The hydrocarbons separated from the first mother liquid in the evaporator 14 are withdrawn at 30 and commingled with paraffinic solvent supplied via valve 31 from the tank 22, the resulting solution being brought to a temperature at which a second fraction is solidified by flow through the heat exchanger 6, the resulting mixture then being separated in the filter 2, as described for the first stage, the same paraffinic solvent being supplied via valve 32 as a washing liquid. The paraffinic solvent is separated from the combined filtrate and washing liquid in the evaporator 16, the vapours being compressed by the compressor 11, and then condensed and returned to the tank 22. The solid cake is treated in the evaporator 15 for the removal of the paraffinic solvent therefrom, the second fraction being withdrawn at 33 as a product having a slightly paraffinic character.

These operations may be repeated in subsequent stages as often as is desired, the hydrocarbons contained in the mother liquid including the filtrate and washing liquid from each of the evaporators 16 and 18 being commingled with solvent supplied through valves 34 and 35, flowed through heat exchangers 7 and 8, if necessary, filtered in the filters 3 and 4 and washed with solvent supplied via valves 36 and 37, the third and fourth fractions obtained from the solidified cakes being withdrawn as products at 38 and 39. It will be noted that the successive stages alternately employ the non-paraffinic and paraffinic solvents. The uncrystallized residue remaining dissolved in the last mother liquid is withdrawn from the evaporator 20 at 40.

The first and third, as well as any subsequent odd-numbered fractions, separated in the solid form in the presence of a non-paraffinic solvent and withdrawn at 29 and 38, will be highly paraffinic in character and will have low carbon residue values. They may be blended to form a composite product, particularly when manufacturing lubricating oils of high viscosity index and low carbon residue. Similarly, the second, fourth, as well as any subsequent even-numbered fractions separated in the solid form in the presence of a paraffinic solvent and withdrawn at 33 and 39 will be only slightly paraffinic in character, i. e., they will have higher densities, and in the case of lubricating oil and similar fractions, will have low viscosity indices and high carbon residues. These fractions may also be blended, as when aromatic materials are desired.

It is not always necessary to operate successive stages at progressively lower temperatures, because the compositions of the mixtures obtained from the evaporators 14, 16 and 18 are often such that the addition of a solvent belonging to a group different from that employed in the previous stage will cause a solid fraction to be formed at the same temperature. (See Example II wherein fractions 3 and 4 were separated at the same temperature.) Certain stages may, therefore, be operated at temperatures the same as, or even higher than the preceding stage.

Although in the foregoing description successive filtration and vaporization apparatus were shown for the purpose of illustrating the sequence of steps, it should be noted that the process may be carried out either continuously or in batch operations, only one filtration apparatus being required in the latter case. The quantities of solvents to be employed may be selected over a relatively wide range, depending upon the sharpness of the separation desired. Thus, from one-half to four volumes of solvents for one volume of the hydrocarbon mixture to be separated are normally suitable. Further, when successive stages are operated at the same temperatures, the intervening heat exchanges may be omitted, provided the temperature of the added solvent and of the solvent-free hydrocarbons permit this. It should be noted, moreover, that a certain amount of refrigeration may be effected when the evaporating operations are conducted without the addition of heat, which is possible when relatively volatile solvents like ethane, propane, sulphur dioxide or dimethyl ether are employed.

The process can, moreover, be simplified by omitting certain of the solvent vaporizing operations. For example, when a fraction with a relatively slightly paraffinic character has been precipitated with the aid of a paraffinic solvent, e. g., propane or pentane, it will often be sufficient for the subsequent stage of crystallization merely to add a solvent from the other group, e. g., a mixture of chloroform and dischlorethane in such a quantity that the resulting solvent mixture has a good solvent power for non-paraffinic hydrocarbons, so that when the temperature is such as to solidify a portion of the hydrocarbons (either at the same or at a lower temperature) a fraction with a relatively highly paraffinic character crystallizes out. In such case the action of the non-paraffinic solvent overcomes that of the paraffinic solvent, so that the resulting mixture of solvents becomes a preferential solvent for hydrocarbons of low paraffinicity. The reduction in temperature may in this case be brought about by vaporizing a portion of the propane present in the mixture. Sometimes it is also possible to add the paraffinic solvent without first removing the non-paraffinic solvent, e. g., when working with benzine and $SO_2$. The reduction in temperature may then be brought about by vaporizing part or all of the $SO_2$.

EXAMPLE I 100 volumes of a dewaxed distillate lubricating oil, the properties of which are shown in the first line of Table I, were dissolved in 140 volumes of a non-paraffinic solvent consisting of 50% by volume of dichlorethane and 50% by volume of chloroform, cooled to $-20°$ C., filtered, and the cake was washed with an equal amount of solvent. The solvent was separated from the combined filtrate and washing solvent, and the recovered oil was dissolved in 200 volumes of a paraffinic solvent consisting of pentane, cooled to $-30°$ C., filtered and washed with an equal amount of pentane. These steps were repeated through six stages, employing the same quantities of solvents to dissolve the filtrate oil and to wash the cakes as described for the first stages. The solvents were separated from the solidified fractions, and the properties determined. The results are shown in Table I.

Table I

| Stage | Solvent | Filtr. temp. | Properties of solidified fractions | | |
|---|---|---|---|---|---|
| | | | Yield | Density, d $100°/4°$ | Conradson Carbon |
| | | °C. | Percent by volume | | Percent by weight |
| | Initial oil | | 100 | 0.8762 | 0.30 |
| 1 | Non-paraffinic | $-20$ | 13.2 | 0.7994 | 0.20 |
| 2 | Paraffinic | $-30$ | 1.0 | 0.9360 | 14.4 |
| 3 | Non-paraffinic | $-40$ | 11.3 | 0.8189 | 0.26 |
| 4 | Paraffinic | $-50$ | 0.5 | 0.9979 | 15.8 |
| 5 | Non-paraffinic | $-60$ | 30.6 | 0.8889 | 0.32 |
| 6 | Paraffinic | $-70$ | 0.6 | 1.0455 | 19.0 |
| | Residue in last mother liquid | | 39.5 | 0.8985 | 0.29 |

It will be seen that the constituents with a high Conradson carbon value were concentrated in the fractions separated in the solid state from the paraffinic solvent, and that the sum of the yields of the odd-numbered fractions of low density and high paraffinicity and the final residue was 94.6. It is, therefore, possible to blend several or all of the odd-numbered fractions if desired, together with the final residue, to produce an oil which is more paraffinic and has a lower carbon residue than the original. These data are plotted in Figure 2 of the drawings, which illustrates the improved results obtainable by this process.

In Figure 2, the filtration temperatures are plotted in abscissae, and the densities and carbon residues of the fractions, as well as of the final residue, are plotted as ordinates. Curve A connects points indicating the densities, and curve B connects points indicating the carbon residues.

EXAMPLE II 100 volumes of a petrolatum from a Mid-Continent crude material, having the properties shown in the first line of Table II, were fractionated in seven separating stages in the manner described in Example I, the initial petrolatum and the petrolatum recovered from each mother liquid from an even-numbered stage being combined with about 400 volumes of a non-paraffinic solvent consisting of equal volumes of dichlorethane and chloroform, and the petrolatum recovered from each mother liquid from an odd-numbered stage (except the last) being combined with about 570 volumes of pentane. The cakes resulting from the crystallizations and filtrations were finally washed with the same quantities of the solvents, the washing liquids being combined with the filtrates. The results are given in Table II:

Table II

| Stage | Solvent | Filtr. temp. | Properties of solidified fractions | | |
|---|---|---|---|---|---|
| | | | Yield | Density d 100°/4° | Melting point |
| | Initial material | 0° C. | Percent by volume 100 | 0.8286 | °C. 50 |
| 1 | Non-paraffinic | 20 | 11.5 | 0.7953 | 69 |
| 2 | Paraffinic | 0 | 7.6 | 0.8265 | 64 |
| 3 | Non-paraffinic | 0 | 22.9 | 0.7862 | 50 |
| 4 | Paraffinic | −20 | 1.0 | 0.8730 | 58 |
| 5 | Non-paraffinic | −20 | 14.8 | 0.7980 | 37 |
| 6 | Paraffinic | −40 | 0.8 | | |
| 7 | Non-paraffinic | −40 | 5.3 | 0.8220 | 27 |
| Residue in last mother liquid | | | 34.2 | 0.8789 | Pour point −20 |

The liquid mixture of hydrocarbon fraction and solvent from a preceding stage was first freed from the solvent in question and subsequently dissolved in the next solvent while heating. It is, however, also possible to commingle the solvent with the hydrocarbon fraction, although the said fraction is already wholly or partly solid with or without subsequent heating.

The foregoing data show that the characters of the fractions solidified and separated are dependent not only upon the temperature of separation, but also upon the type of the solvent or diluent employed, and that by employing a plurality of stages in which the solvents are alternated the crystallized products have a high degree of purity.

I claim as my invention:

1. A process for separating a hydrocarbon mixture substantially free from asphalt containing a hydrocarbon component which is relatively slightly paraffinic and a hydrocarbon component which is relatively highly paraffinic into fractions having different properties, comprising the steps of commingling said mixture with a first preferential solvent for a first one of said hydrocarbon components to dissolve at least some of the mixture in the first solvent, separating a concentrate of the second component in the solid state as a first fraction of the mixture from a first mother liquid containing said first solvent and a second fraction of the mixture dissolved therein, one of said fractions containing both said components, the commingling fraction which contains both of said components with a second preferential solvent for the second of said hydrocarbon components to dissolve at least some of it in the second solvent, and separating a third fraction as a concentrate of the first component in the solid state from a second mother liquid containing said second solvent and dissolved component of said fraction which was commingled therewith.

2. A process for separating a hydrocarbon mixture substantially free from asphalt containing a hydrocarbon component which is relatively slightly paraffinic and a hydrocarbon component which is relatively highly paraffinic into fractions having different properties, comprising the steps of commingling said mixture with a first preferential solvent for a first of said hydrocarbon components to dissolve at least some of the mixture in the first solvent, separating a concentrate of the second component as a first fraction of the mixture in the solid state from a first mother liquid containing said first solvent and a portion of the mixture dissolved therein, said portion containing both said components, commingling said dissolved portion with a second preferential solvent for the second of said hydrocarbon compounds to dissolve at least some of said portion in the second solvent, and separating a concentrate of first component as a second fraction in the solid state from a second mother liquid containing said second solvent and dissolved components of said portion which was commingled therewith.

3. A process for separating hydrocarbon mixtures substantially free from asphalt into fractions of different characters, comprising the alternate steps of solidifying a fraction of the mixture having a relatively slightly paraffinic character from a solution thereof with a paraffinic solvent and solidifying a fraction of the mixture having a relatively highly paraffinic character from a solution thereof with a non-paraffinic solvent, the solidified fractions being separated from the mother liquids containing the solvent and the unsolidified hydrocarbons after each solidification, and the unsolidified hydrocarbons from one of said solidification steps containing both fractions of highly and slightly paraffinic character being employed as the solute in the other of said solidification steps.

4. A process for separating hydrocarbon mixtures substantially free from asphalt into fraction of different characters, comprising the alternate steps of solidifying a fraction of the mixture having a relatively high carbon residue from a solution thereof with a paraffinic solvent and solidifying a fraction of the mixture having a relatively low carbon residue from a solution thereof with a non-paraffinic solvent, the solidified fractions being separated from the mother liquids containing the solvent and the unsolidified hydrocarbons after each solidification, and the unsolidified hydrocarbons from one of said solidification steps containing both fractions of high and low carbon residue being employed as the solute in the other of said solidification steps.

5. A process for separating hydrocarbon mixtures substantially free from asphalt into fractions of different characters, comprising the steps of dissolving said mixture in a paraffinic solvent, solidifying a first fraction of said mixture of a relatively slightly paraffinic character from said solution, separating said solidified first fraction from the first mother liquid containing the said paraffinic solvent and both relatively highly and relatively slightly paraffinic liquid hydrocarbons, adding a non-paraffinic solvent to the hydrocarbons in the first mother liquid, solidifying a second fraction of said mixture of a relatively highly paraffinic character from the resulting solution, and separating said solidified second fraction from the second mother liquid containing the paraffinic solvent and liquid hydrocarbons.

6. The process according to claim 5 in which the paraffinic solvent is separated from the liquid hydrocarbons in the first mother liquid before the non-paraffinic solvent is commingled with the hydrocarbons in said first mother liquid.

7. The process according to claim 5, in which the non-paraffinic solvent is added to the first mother liquid without removing the paraffinic solvent therefrom.

8. The process according to claim 5, in which the temperature at which the second fraction is separated from the second mother liquid is not substantially lower than the temperature at which the first fraction is separated from the first mother liquid.

9. A process for separating hydrocarbon mixtures substantially free from asphalt into fractions of different characters, comprising the steps of dissolving said mixture in a non-paraffinic solvent, solidifying a first fraction of said mixture of a relatively highly paraffinic character from said solution, separating said solidified first fraction from the first mother liquid containing the said non-paraffinic solvent and both relatively highly and relatively slightly paraffinic liquid hydrocarbons, adding a paraffinic solvent to the hydrocarbons in the first mother liquid, solidifying a second fraction of said mixture of a relatively slightly paraffinic character from the resulting solution, and separating said solidified second fraction from the second mother liquid containing the non-paraffinic solvent and liquid hydrocarbons.

10. The process according to claim 9, in which the temperature at which the second fraction is separated from the second mother liquid is not substantially lower than the temperature at which the first fraction is separated from the first mother liquid.

11. The process according to claim 9 in which the non-paraffinic solvent is separated from the liquid hydrocarbons in the first mother liquid before the paraffinic solvent is commingled with the hydrocarbons in said first mother liquid.

12. The process according to claim 9 in which the paraffinic solvent is added to the first mother liquid without removing the non-paraffinic solvent therefrom.

GERRIT WILLEM NEDERBRAGT.